July 20, 1926.
H. Z. CUTLER
1,593,242
AUTOMOBILE RADIATOR
Original Filed Nov. 16, 1920
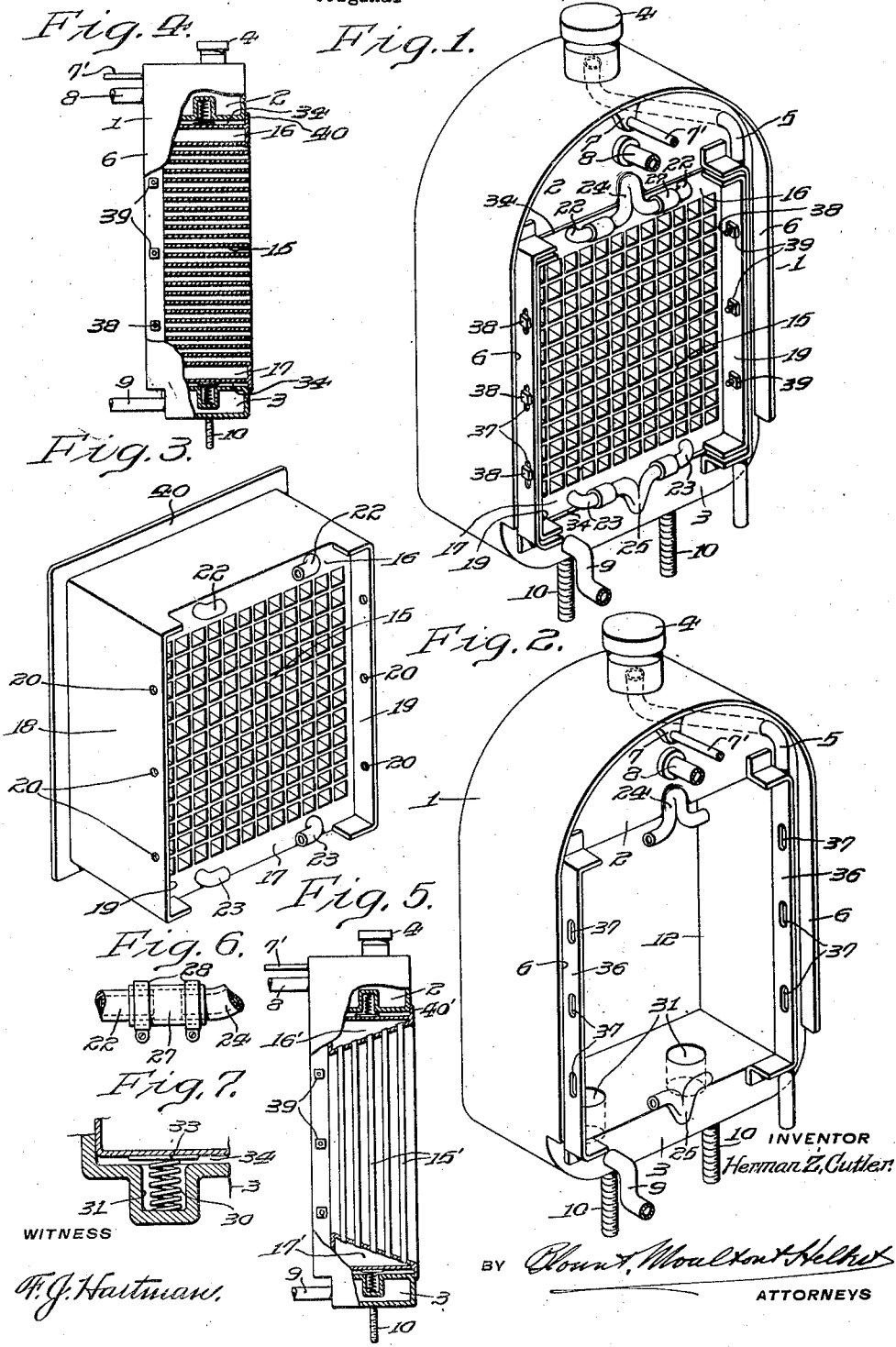
INVENTOR
Herman Z. Cutler.
WITNESS
F. J. Hartman.
BY
ATTORNEYS Patented July 20, 1926.

1,593,242

UNITED STATES PATENT OFFICE.

HERMAN Z. CUTLER, OF CAMDEN, NEW JERSEY, ASSIGNOR TO CUTLER AUTO RADIATOR COMPANY, A CORPORATION OF NEW JERSEY.

AUTOMOBILE RADIATOR.

Application filed November 16, 1920, Serial No. 424,375. Renewed February 12, 1926.

A principal object of my invention is to provide a radiator having an outer shell or casing surrounding a removable core which may be readily removed from and returned to the shell or casing to facilitate replacement or repair of the core. A further object of my invention is to provide an automobile radiator having a removable core yieldingly supported in a surrounding shell or casing adapted to be secured to the frame of the automobile and embodying flexible connections between the shell or casing and the core so that a slight relative movement may take place between the core and the casing, thus relieving the former of strains or shocks communicated to the casing as the automobile traverses the highway and minimizing the danger of leakage or rupture of the delicate cooling tubes of which the core is in major part composed. A still further object of my invention is to provide an automobile radiator having a preferably cast outer shell or casing of relatively great strength and stiffness and a removable core positioned therein and protected from injury thereby, and in which, owing to its inherent stiffness, the casing to some extent assists in bracing the frame members of the automobile to which it may be secured. A still further object is the provision in an automobile radiator having a removable core of means for yieldingly supporting the core within the outer shell of the radiator so that the core will "float" within the shell and be thus relieved from strains or shocks to which the shell may be subjected.

My invention further includes all of the other various objects and novel features of construction and arrangement hereinafter more definitely specified and described.

In the accompanying drawing I have illustrated one embodiment of my invention as applied to an automobile radiator in which the core is of the well known honeycomb construction, and I have also shown a slightly modified form of the invention as applied to a radiator in which the core comprises a plurality of vertically extending tubes.

In the said drawing, Fig. 1 is a rear perspective view of the first of these forms of the invention with the several parts in assembled position; Fig. 2 is a similar view of the shell or casing with the core, shown in perspective in Fig. 3, removed therefrom. Fig. 4 is a side elevation, partially in vertical section, of the assembled radiator shown in Fig. 1 but on a somewhat smaller scale, and Fig. 5 is a similar view showing a slightly modified form of the invention in which the core is composed of vertically extending tubes. Fig. 6 is a fragmentary side elevation of one of the flexible water connections which are preferably used between the shell and the core, and Fig. 7 is a fragmentary view in vertical section of a portion of the shell and core showing one of the core supporting means in operative position. Similar numerals are used to designate corresponding parts in the several figures.

The forms of the invention illustrated in the drawing comprise an outer casing or shell 1 which is preferably of cast metal as an integral unit and comprises a tank or chamber 2 in its upper portion and a substantially similar tank or chamber 3 in its lower portion, these tanks extending transversely across the shell and being non-communicating. The shell may be provided with a filler cap 4, an overflow pipe 5 communicating with the upper tank, a rearwardly extending flange 6 which forms a seat for the forward edge of the automobile hood, and a lug 7 on the flange affording a point of support for the rearwardly extending brace rod 7', in the ordinary manner. Communicating with the tank 2 is a water connection 8 and with the tank 3 a similar connection 9, which are respectively connected with the engine of the automobile when the radiator is in use, and for securing the casing to the frame of the automobile a pair of stud bolts 10 secured to the lower part of the casing may conveniently be provided, although any other suitable means for securing the radiator in position may be employed.

It will be understood that the upper and lower tanks and the sides of the shell form the boundaries of a preferably rectangular opening 12 in which, when the parts are assembled, the core of the radiator is supported. This core, which is preferably unitary and one form of which is best shown in Fig. 3, may be of any type suitable for effecting the cooling of the water in the radiator and of such shape as to generally conform to the opening 12, the form illustrated in Figs. 1, 3 and 4 being of the well known honeycomb construction comprising a plurality of horizontally and vertically extending sheets of thin metal positioned closely together and providing numerous small interstices through which the water trickles during the cooling operation, the particular arrangement and construction thereof being well understood in the art and forming no part of the present invention. The portion of the core to which reference has just been made and which is designed to effect the cooling of the contained liquid, is designated generally in the drawing as 15. Above and below the portion 15 of the core and connected therewith are header tanks 16 and 17 preferably of sheet metal and extending transversely across the core, the upper and lower surfaces of the metal from which the tanks are formed joining the vertically extending sides 18 of the core which are preferably extended rearwardly somewhat beyond the rear face of the portion 15 to form flanges 19 provided with bolt holes 20. Tank 16 is provided, preferably on its rear side, with a pair of connections 22, and tank 17 with a pair of similar connections 23, each pair of connections being preferably in the form of short elbows with their open ends directed inwardly toward each other. The tank 2 is provided with a preferably centrally positioned, substantially Y-shaped connection 24 and the tank 3 with a substantially similar connection 25, the open ends of these connections being directed outwardly and the parts arranged in such position that when the core is assembled in the shell, as shown in Fig. 1, the ends of the connection 24 will extend toward the connections 22 and the ends of the connection 25 similarly extend toward the ends of the connections 23, to enable the several connections to be joined with short pieces 27 of flexible tubing or hose conveniently held in position by hose clamps 28 or in any other suitable manner. These flexible connections merely serve as conduits for the liquid in its passage through the radiator.

For yieldingly supporting the core within the casing or shell, suitable means are provided which, in the preferred embodiment of the invention, may comprise a plurality of springs 30 each positioned in a suitable pocket 31 formed within the shell. Preferably these pockets are arranged in the inner walls of the tanks 2 and 3 so as to open into the rectangular opening 12, but if desired additional pockets may be arranged in the sides of the shell to open into the sides of the opening. Each of the springs preferably carries a presser plate 33 adapted to engage against the core when the latter is in position, and as the core is preferably made of substantially the width of the opening 12 and a little less than its height, when assembled in the casing the top and bottom of the core will rest on the presser plates of the springs and a slight clearance 34 be left between the upper and lower extremities of the core and the adjacent portions of the casing. If desired the width of the core may be so arranged that a similar clearance will occur between the sides of shell and the sides of the core, although in preferred constructions such clearance is ordinarily omitted.

For securing the core in assembled position within the shell I may make use of any suitable means but prefer to provide the shell with a pair of rearwardly projecting vertical flanges 36 provided with vertical slots 37 adapted to register with the holes 20. Through these slots and the corresponding holes are passed bolts 38, and to secure the bolts in position nuts 39 may be drawn up against the inner faces of the flanges 19 but preferably not so tightly as to prevent the bolts from moving up and down in the slots in case of any relative movement between the core and the shell.

In order to cover the line of demarkation or joint between the core and the shell on the front side of the radiator, I preferably provide the front of the core with a peripheral outwardly extending flange 40 which, when the core is assembled in the shell, rests adjacent the front of the shell and preferably in contact therewith and thus conceals the joint between the parts as best shown in Fig. 4.

In the form of the invention shown in Fig. 7 the removable core comprises a plurality of vertically extending tubes instead of the honeycomb construction shown in the other figures, these tubes extending between the header tanks 16' and 17', and as in certain forms of radiators it is preferred to render these tanks substantially invisible from the front they may, as shown in Fig. 7, be made very shallow toward the front and deepened toward the rear, so that when the parts are assembled all that will be visible at the front side of the tank will be the cooling tubes 15', the peripheral flange 40' covering the joint betwen the core and the shell, and the front part of the shell itself.

It will thus be apparent that I have provided a radiator suitable for use under conditions in which the ordinary well-known forms of radiators are employed, and that when so employed, the liquid circulation will take place in the ordinary manner, that is, from the tank 2 through the cooling core to the tank 3 and thence to the motor, from whence the liquid returns to tank 2 in a continuous cycle; that the core may readily be removed from the shell as required for replacement or repair by loosening the flexible connections 27, removing the bolts 38, and drawing the core forwardly out of the casing, and that when the core is assembled in the shell it is yieldingly or floatingly supported therein and thereby relieved from strains or shocks which might otherwise be detrimental to the relatively delicately constructed core.

In the foregoing description of my invention I have stated that the shell or casing is preferably cast as an integral unit, as I have found that satisfactory casings may be very cheaply produced in that manner and when so produced may be finished by grinding and filing with the necessity of little or no machine work, and furthermore that casings so formed are strong and stiff and afford maximum protection to the relatively delicate core. However, if desired, the shell or casing may be formed by methods other than casting as an integral unit, for example, by forming the same from sheet metal, or by forming the same with a number of cast or stamped sections suitably joined together. It will furthermore be understood that the particular form of the radiator may be varied and that the general outline and appearance of the shell may be made to conform to those of various well known forms of automobile radiators in order to adapt the radiator for use on the different well known makes of automobiles as may be desired; that the particular construction and shape of the core and the precise arrangement, direction and position of the several water connections may be varied, and that other changes and modifications may be made in the details of construction and arrangement of the several parts without departing from the spirit and scope of the invention as defined in the appended claims.

Having thus described my invention, I claim and desire to protect by Letters Patent of the United States:—

1. An automobile radiator comprising a casing member having a chamber therein for the water of a cooling system, said casing having an outlet opening therethrough communicating with said chamber, a unitary core member removably retained within said casing, a conduit flexibly connecting the interior of said core member with said outlet opening of said casing member, springs interposed between the bottom and top of said core member and the top and bottom walls of said opening through said casing member for yieldingly supporting said core member and for spacing the top and bottom of said core member from said casing member, and rigid means to prevent relatively horizontal and to permit relatively vertical movement of said members with respect to each other.

2. An automobile radiator comprising a casing having upper and lower tanks and an opening between said tanks for the reception of a core, a unitary core removably positioned within said opening, resilient means for yieldingly supporting said core within said casing and operative to permit a vertical floating movement of said core with respect to said casing, flexible water connections between said tanks and said core and a vertical sliding connection for retaining said core in said casing and for permitting said core to freely vibrate vertically with respect to said casing.

3. An automobile radiator comprising a rigid unitary casing member having an upper tank and provided with a central opening therethrough, a removable unitary core member positioned in said opening, a flexible water connection between said tank member and said core member, springs interposed between the bottom and top of said core member and the adjacent walls of the opening through said casing member, and rigid means mounted in one of said members and passing through a vertical slot in the other of said members for preventing relatively horizontal movement and for permitting relatively vertical movement of said members with respect to each other.

4. An automobile radiator comprising a rigid casing having non-communicating spaced tanks and surrounding a central opening, a removable unitary core positioned in said opening, flexible conduits connecting said core and said tanks, means for yieldingly supporting the core within the opening comprising a plurality of springs positioned in pockets in the casing and presser plates interposed between the free ends of said springs and the sides of the core, and means for retaining the core within the casing comprising a flange on the core, a complementary slotted flange on the casing and bolts rigid with the flange on the core and loosely extending through the slots in the flange on the casing.

5. An automobile radiator comprising a rigid casing having upper and lower spaced tanks and defining a central opening, a removable core adapted to enter said opening, a plurality of springs positioned in pockets within said casing and adapted to support said core, flexible water connections between said core and each of said tanks, a peripheral flange adjacent the front of said core adapted to engage the casing, and means for maintaining the core in position within the casing.

6. An automobile radiator comprising a rigid casing having upper and lower spaced tanks and defining a central opening, a removable core adapted to enter said opening and of slightly less height than the height of said opening, a plurality of springs positioned in pockets within said casing and adapted to support said core, flexible water connections between said core and each of said tanks, a peripheral flange adjacent the front of said core adapted to engage the casing, and means for maintaining the core in position within the casing comprising parallel flanges carried by the core and by the casing, one of said flanges having a plurality of slots, and a plurality of bolts carried by the other of said flanges and extending loosely through said slots, whereby said core is retained within the casing but is capable of slight relative vertical movement with respect thereto.

7. An automobile radiator comprising a rigid casing having upper and lower tanks and a central opening, a core removably positioned in said opening and having a central cooling portion and a header tank above and below said portion, flexible water connections respectively between said upper and lower tanks and the adjacent header tanks, a plurality of springs positioned in pockets formed adjacent said upper and lower tanks and operative to yieldingly support the core within the casing, a peripheral flange adjacent the front of the core adapted to engage the casing, and means for retaining the core within the casing and adapted to permit slight relative movement between the core and the casing.

8. In an automobile radiator the combination of a rigid frame-like casing provided with an opening therethrough having vertical parallel side walls and having top and bottom walls, a unitary radiator core mounted within said opening and fitted to slide vertically between said vertical walls of said opening and comprising an upper tank and a lower tank, a water cooling section connecting said tanks, a rigid water-supply conduit, a flexible connection connecting said supply conduit with the interior of said upper tank, a rigid water-delivery conduit, a flexible connection connecting the interior of said lower tank with said delivery conduit, resilient means interposed between the top of said core and the top wall of said opening and between the bottom of said core and the bottom wall of said opening and normally holding said core spaced from said top and bottom walls, and means for removably retaining said core within said casing and for permitting a relatively vertical sliding movement of said core with respect to said casing.

9. In an automobile radiator the combination of a rigid frame-like casing provided with an opening therethrough having vertical parallel side walls and top and bottom walls, a unitary radiator core removable from said casing, mounted within said opening and fitted to slide vertically between said vertical walls of said opening, a rigid water-supply conduit, a flexible connection connecting said supply conduit with the interior of said core at the upper part thereof, a rigid water-delivery conduit, a flexible connection connecting the interior of the lower part of said core with said delivery conduit, means interposed between the top and bottom of said core and the top and bottom walls respectively of said casing and tending to hold said core spaced from said top and bottom walls, a flange on the front of said core covering the edges of the opening, and means for removably connecting the back of said core to the back of said casing and for permitting a relative vertical sliding movement of said core with respect to said casing.

In witness whereof, I have hereunto set my hand this 15th day of November, 1920.

HERMAN Z. CUTLER.